(12) United States Patent
Holland et al.

(10) Patent No.: US 10,500,837 B2
(45) Date of Patent: Dec. 10, 2019

(54) FILAMENT SWAPPING IN THREE-DIMENSIONAL PRINTING

(71) Applicant: MakerBot Industries, LLC, Brooklyn, NY (US)

(72) Inventors: Samuel Holland, Brooklyn, NY (US); Mark Waller, Greenfield, MA (US); Carlos Fernandez Arreola, Brooklyn, NY (US); Vishnu Anantha, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 428 days.

(21) Appl. No.: 15/395,230

(22) Filed: Dec. 30, 2016

(65) Prior Publication Data
US 2017/0190108 A1    Jul. 6, 2017

Related U.S. Application Data

(60) Provisional application No. 62/273,307, filed on Dec. 30, 2015.

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *B29C 64/106* | (2017.01) |
| *B29C 64/20* | (2017.01) |

(Continued)

(52) U.S. Cl.
CPC ............ *B33Y 50/02* (2014.12); *B29C 64/106* (2017.08); *B29C 64/20* (2017.08); *B29C 64/386* (2017.08); *B33Y 10/00* (2014.12); *B33Y 30/00* (2014.12); *B29K 2105/0067* (2013.01)

(58) Field of Classification Search
CPC ..... B29C 48/92; B29C 48/266; B29C 48/265; B29C 48/02; B29C 64/106; B29C 64/386; B29C 64/20; B29C 64/205; B29C 64/209; B29C 64/40
See application file for complete search history.

(56) References Cited

U.S. PATENT DOCUMENTS

| | | |
|---|---|---|
| 5,836,068 A | 11/1998 | Bullen et al. |
| 7,027,887 B2 | 4/2006 | Gaylo et al. |
| 7,172,715 B2 | 2/2007 | Swanson et al. |

(Continued)

*Primary Examiner* — Joseph S Del Sole
*Assistant Examiner* — Mohamed K Ahmed Ali
(74) *Attorney, Agent, or Firm* — Strategic Patents, P.C.

(57) ABSTRACT

An extruder is fitted with a connector for coupling and decoupling with a filament feed source, such as a filament tube. When connected, the extruder and filament tube are aligned to define a feed path for a filament. A tool rack includes a plurality of filament tubes secured within respective openings. The tool rack may facilitate coupling and decoupling operations between the extruder and filament sources. For example, the tool rack may define an insertion path that engages a filament tube during insertion, and that secures the filament tube against an excursion from the insertion path. The extruder may disengage the coupling by initiating a motion along the insertion path and then moving off of the insertion path to decouple the filament tube and the extruder. In this manner, filaments may be swapped through engaging and disengaging the extruder with different filament tubes on the tool rack.

20 Claims, 6 Drawing Sheets

(51) Int. Cl.
*B29C 64/386* (2017.01)
*B29K 105/00* (2006.01)

(56) References Cited

U.S. PATENT DOCUMENTS

| | | |
|---|---|---|
| 7,604,470 B2 | 10/2009 | LaBossiere et al. |
| 7,625,198 B2 | 12/2009 | Lipson et al. |
| 7,625,200 B2 | 12/2009 | Leavitt |
| 2013/0089642 A1 | 4/2013 | Lipson et al. |
| 2014/0050811 A1 | 2/2014 | Lipton et al. |
| 2014/0117585 A1* | 5/2014 | Douglas ................ B33Y 30/00 264/401 |
| 2014/0121813 A1* | 5/2014 | Schmehl ................ B33Y 30/00 700/119 |
| 2016/0185042 A1* | 6/2016 | Toh ........................ B29C 64/20 425/132 |
| 2017/0190109 A1* | 7/2017 | Holland ................ B33Y 50/02 |

* cited by examiner

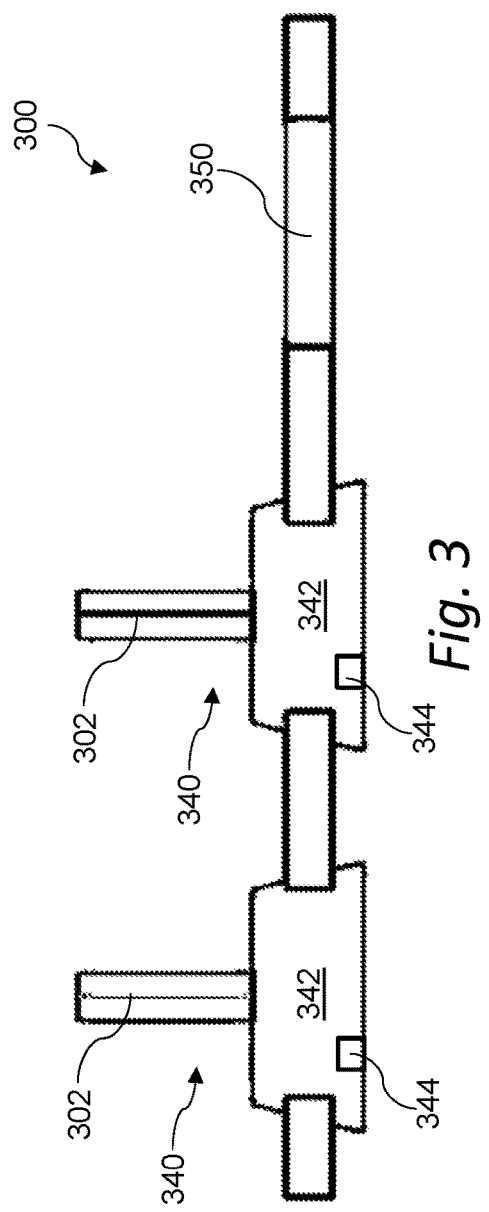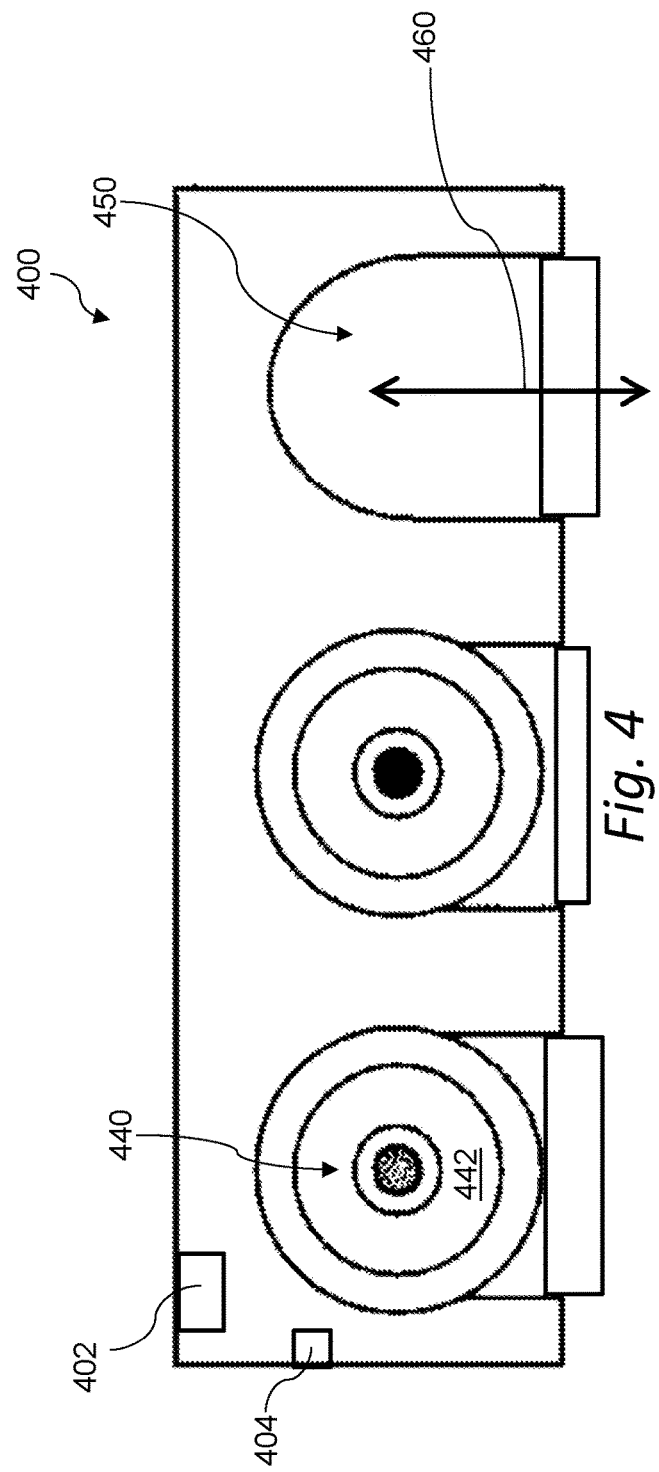

FILAMENT SWAPPING IN THREE-DIMENSIONAL PRINTING

CROSS-REFERENCE TO RELATED APPLICATIONS

This application claims the benefit under 35 U.S.C. § 119(e) of U.S. Provisional Application No. 62/273,307 filed on Dec. 30, 2015, the entire contents of which are hereby incorporated by reference.

TECHNICAL FIELD

The disclosure relates to filament swapping in three-dimensional printing, and to a tool rack for filament tubes.

BACKGROUND

In three-dimensional printing processes, filaments are extruded to fabricate objects. As the supply of filament is depleted during the fabrication of an object the filament moving through an extruder is swapped during the three-dimensional printing process. Similarly, filament swapping occurs as a different color or type of material is required during the three-dimensional printing process. Filament swapping can be disruptive to the three-dimensional printing process, resulting in inefficiencies in the process.

SUMMARY

Improved filament swapping in three-dimensional printing may be advantageous. An extruder may be fitted with a connector for coupling to and decoupling from a filament feed source such as a filament tube with a mating connector. When engaged through these connectors, the extruder and filament tube are aligned, defining a feed path for a filament through the filament tube and the extruder. A tool rack may include a plurality of filament tubes (e.g., filament tubes having different colored filaments) secured within respective openings in the tool rack. The tool rack may be configured to facilitate coupling and decoupling operations between the extruder and filament sources. For example, the tool rack may define respective insertion paths, with each insertion path engageable with one of the filament tubes during insertion to secure the filament tube against an excursion from the insertion path. Thus, the extruder or other robotic system may initiate motion along the insertion path to couple the filament tube and the extruder and then move off of the insertion path to disengage the filament tube from the extruder. In this manner, filaments may be swapped through engaging and disengaging the extruder with different filament tubes on the tool rack during a three-dimensional print.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 3 is a front view of a tool rack.

FIG. 4 is a top view of a tool rack.

DETAILED DESCRIPTION

Figure 1:
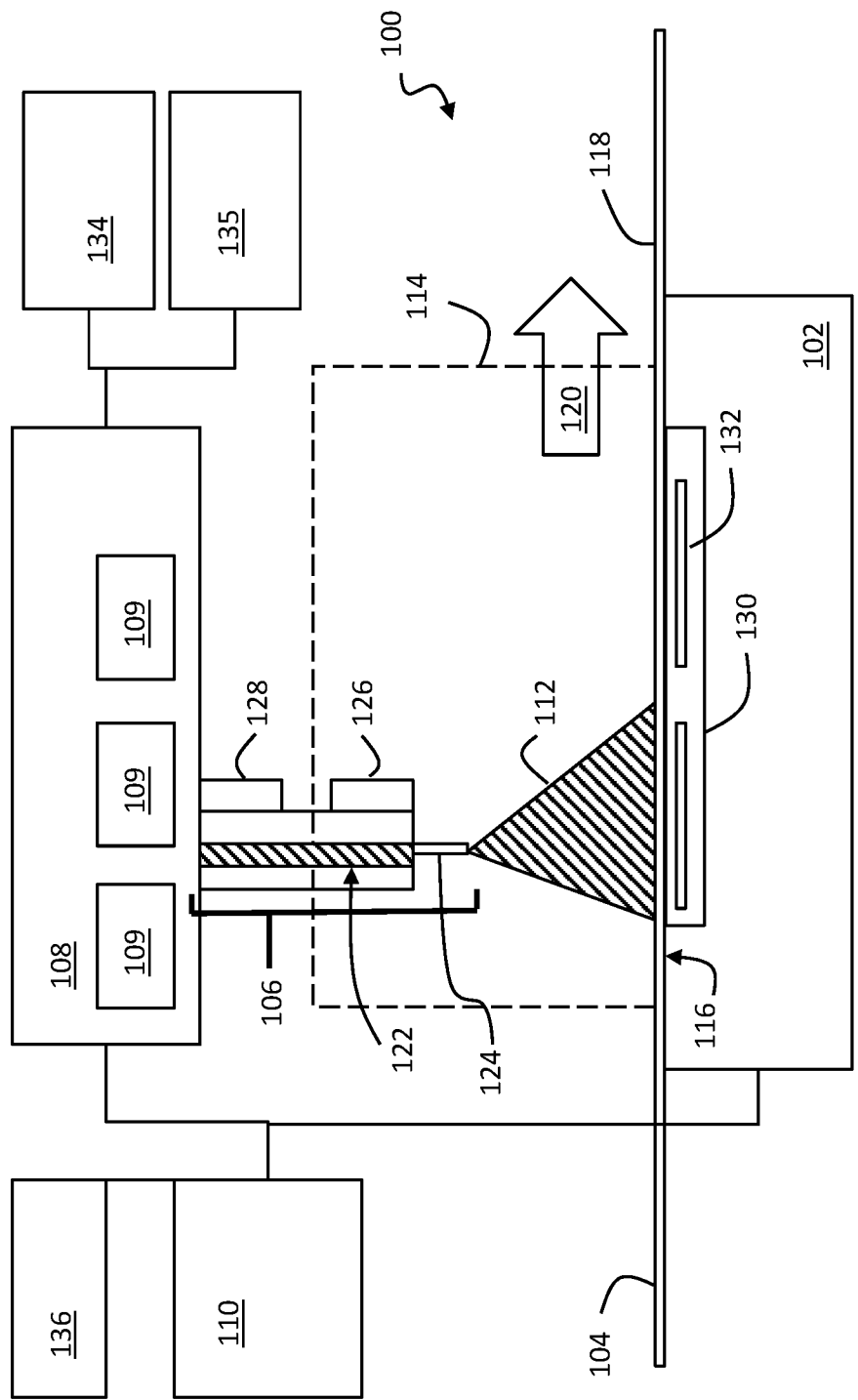
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to illuminate better the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

The following description emphasizes three-dimensional printers using fused deposition modeling or similar techniques where a bead of material is extruded in a layered series of two dimensional patterns as "roads" or "paths," to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms used herein such as "printer," "three-dimensional printer," "fabrication system," and so forth, unless a more specific meaning is explicitly provided or otherwise clear from the context.

FIG. 1 is a block diagram of a three-dimensional printer. In general, a printer 100 may include a build platform 102, a conveyor 104, an extruder 106, an x-y-z positioning assembly 108, and a controller 110 that cooperate with one another to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that, while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyer 104 may, additionally or alternatively, include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of build material to the surface 118 and/or to facilitate removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to facilitate build processes as described herein. For example, the chemical treatment may include deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 defining an exit port with a circular, oval, slotted or other cross-sectional profile that extrudes build material in a desired cross-sectional shape.

The extruder 106 may include a heater 126 to melt build materials (e.g., thermoplastic material) within the chamber 122 for extrusion through the extrusion tip 124 in melted form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also, or instead, include a motor 128 to push the build material into the chamber 122, through the extrusion tip 124, or a combination thereof.

In general operation (and by way of example rather than limitation), a build material, such as ABS plastic in filament form, may be fed into the chamber 122 from a spool by the motor 128, melted by the heater 126, and extruded from the extrusion tip 124. By controlling process parameters (e.g., one or more of a rate of the motor 128 and the temperature of the heater 126) the build material may be extruded at a controlled volumetric rate. It will be understood that a variety of techniques may be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be movable to three-dimensionally position the extruder 106 and the extrusion tip 124 within the working volume 114. Thus, for example, by controlling the volumetric rate of delivery for the build material and the x, y, z position of the extrusion tip 124, the object 112 may be fabricated in three dimensions by depositing successive layers of material in two-dimensional patterns derived (e.g., two-dimensional patterns derived from cross-sections of a computer model or other computerized representation of the object 112). The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. Additionally, or alternatively, the conveyor 104 may be x, y, and z positionable, and the extruder 106 may be, optionally, stationary. Further, or instead, the extruder 106 may be x, y, and z positionable while the conveyor 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system may serve as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of material of the conveyer 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used, for example, to ensure that the object 112 is removed from the conveyer 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may include a sensor that detects a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (e.g., a radiant heater or forced hot air) to heat the working volume 114 to maintain the object 112 at a fixed, elevated temperature throughout a build. The sensor 134 may also, or instead, include a cooling element to maintain the object 112 at a predetermined sub-ambient temperature throughout a build. It should be appreciated that a heater included in the sensor 134 may be instead of, or in addition to, the thermal element 130.

The sensor 134 may also, or instead, include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also, or instead, include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also, or instead, include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Devices, systems, and methods for filament swapping in three-dimensional printing will now be described. In general, techniques are described for automatic filament swapping and loading before and during a three-dimensional print. As described in greater detail below, this can be facilitated through the inclusion of filament tubes having connectors and extruders having corresponding connectors. For example, if each filament tube terminates with a ring magnet and a similar ring magnet is mounted on the extruder, a concentric mating can be achieved if these two components come within a predetermined distance of one another.

Devices, systems, and methods for filament swapping in three-dimensional printing may also, or instead, include a tool rack, such as one made of sheet metal, plastic, or a combination thereof, that can hold multiple filament tubes, for example, off to the side of a gantry for an extruder in a three-dimensional printer. As described in greater detail below, if the extruder passes underneath the filament tube, the extruder and filament tube can snap together to form an engagement. As also described in greater detail below, to disconnect a filament tube, the extruder can move in a predetermined manner with respect to an insertion path defined by the tool rack such that a resulting force can disengage the filament tube from the extruder.

There are many advantageous uses of the devices, systems, and methods of filament swapping described herein. For example, filament swapping according to the devices, systems, and methods described herein can facilitate using different colors in one print (e.g., where the extruder can swap between each automatically). Additionally, or alternatively, the same color may be loaded on multiple filament tubes to increase the likelihood that there is enough material to finish a print. Implementations may also, or instead, facilitate automatic filament loading. For example, the printer can hold multiple colored spools of filament and allow a user to simply select which color to use during a print. Further, or in the alternative, the printer may load a color automatically and begin printing.

Figure 2:
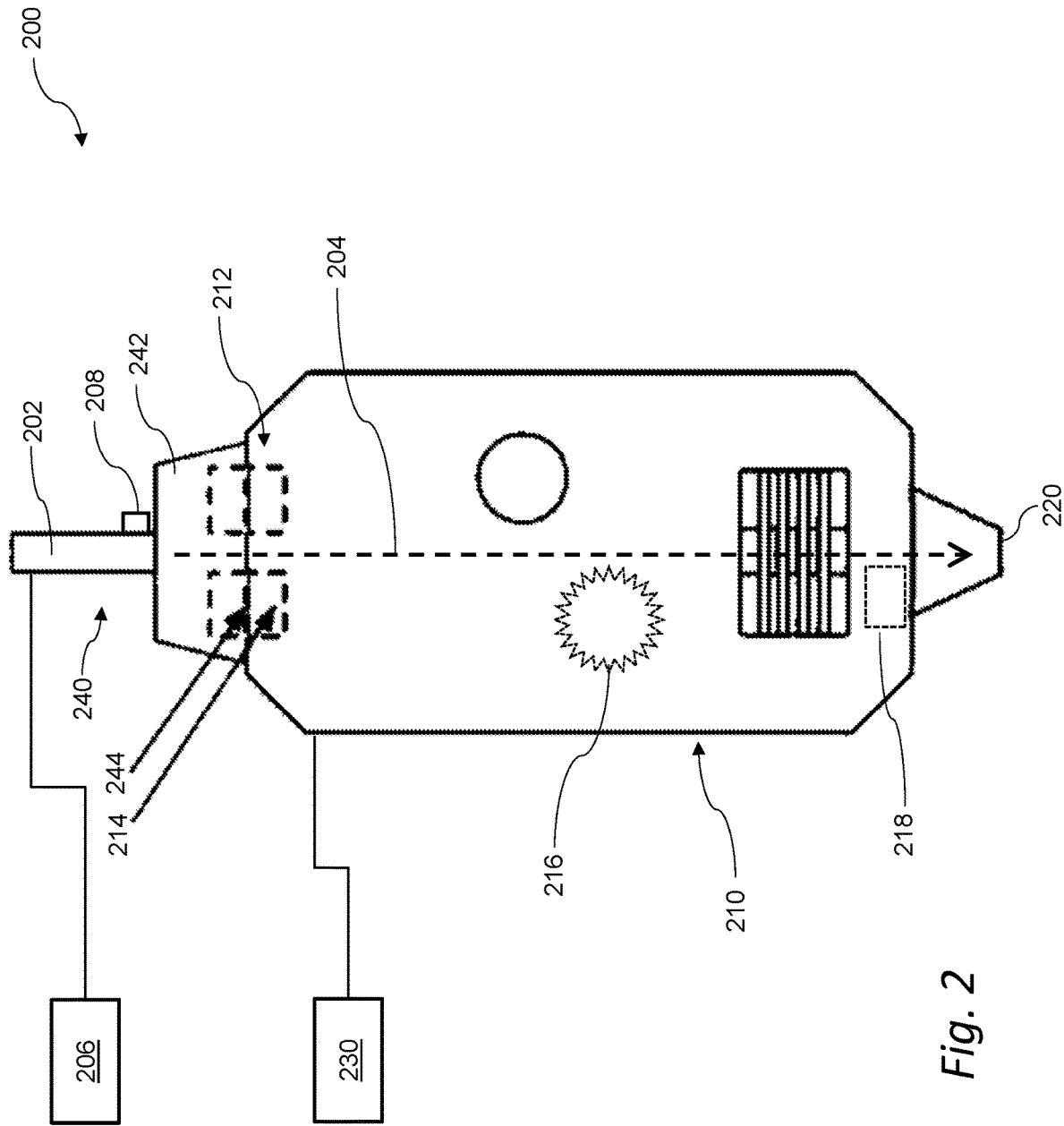
FIG. 2 is a schematic representation of an extruder coupled to a filament tube.

FIG. 2 is a schematic representation of an extruder coupled to a filament tube. Specifically, a device 200 may include an extruder 210, a robot 230 to position the extruder 210, and a filament tube 240.

The extruder 210 may include a first fixture 212 having a first connector 214. The first fixture 212 may include a housing of the extruder 210, a portion thereof, or an element connected to the extruder 210. The first connector 214 may include a first magnet (e.g., a ring magnet). While fixed magnets can usefully provide a mechanical coupling that self-aligns to a desired position, it will be understood that other forms of coupling may also or instead be used. For example, a magnetic coupling may be augmented with one or more self-aligning mechanical features such as positive or negative detents, kinematic couplings, or combinations thereof. The first connector 214 may also, or instead, use other alignment and engagement mechanisms, including a variety of active and passive mechanisms such as grooves, notches, arms, slots, levers, threaded rods, electromagnets, and combinations thereof.

The extruder 210 may include a drive gear 216 to advance a filament 202 through the extruder 210. In certain instances, the extruder 210 may include a heat source 218 to melt the filament 202 into a melted state in the extruder 210. Additionally, or alternatively, the extruder 210 may define an extrusion port 220. It should be appreciated that, in use, the filament 202 in the melted state may be extruded through the extrusion port 220, which may be located, for example, on a nozzle of the extruder 210.

The robot 230 may be coupled to the extruder 210 and movable vertically and horizontally in a three-dimensional printing process. The robot 230 may, for example, include an x-y-z positioning system of a three-dimensional printer.

The filament tube 240 may include a second fixture 242 having a second connector 244. The second connector 244 may be positioned, for example, to secure the filament tube 240 in a predetermined alignment with the extruder 210 through a coupling between the first connector 214 and the second connector 244. The filament tube 240 and the extruder 210, in the predetermined alignment, may define a feed path 204. For example, the feed path 204 may extend through the filament tube 240 and the extruder 210. It will be understood that the filament tube 240 may constrain and guide the filament through the second fixture 242 into the extruder 210. For example, the filament tube 240 may include an extended guide such as a guide tube from a build material source (e.g., a spool of filament) to the second connector 244. As a further or alternative example, the filament tube 240 may define a cylindrical opening through the second connector 244. More generally, the filament tube 240 may include any component or group of components coupled to the second connector 244 and guiding a build material from a source to the extruder 210 (when coupled to the second connector 244).

The second fixture 242 may include, for example, an end of the filament tube 240. In certain instances, the second fixture 242 may also or instead be discrete component connected to the filament tube 240. In instances in which the first connector 214 includes a first magnet, the second connector 244 may include a second magnet (e.g., a ring magnet). Thus, in certain aspects, the coupling may include a magnetic coupling between the first magnet and the second magnet. While the first connector 214 and the second connector 244 have been described as including a first magnet and a second magnet, respectively, it should be appreciated that the first connector 214 and the second connector 244 may also or instead include other types of connecting elements or features including, but not limited to, clamps, clips, male/female connectors, snap-fit parts, friction fit parts, suction, hook and loop, latches, keys, pins, screws, sliders, and combinations thereof. In certain implementations, the second fixture 242 may include a one-way gear to engage the filament within the second fixture 242 and retain the filament even when the filament is not engaged with a drive motor of an extruder. The second fixture 242 may assist in control of dispensing filament in a three-dimensional printing process as contemplated herein and, thus, may include a pre-heater, a filament detector, and combinations thereof.

The device 200 may be engageable with a tool rack, such as any one or more of those described herein. The tool rack may, for example, define an opening and an insertion path. Continuing with this example, the second fixture 242 may be positionable in the opening along the insertion path—e.g., an insertion path to receive and secure the second fixture 242. Specifically, the tool rack may secure the second fixture 242 positioned in the opening against an excursion by the robot 230 from the insertion path to disengage the coupling between the first connector 214 and the second connector 244 to separate the filament tube 240 from the extruder 210. In other words, in certain aspects, when the robot 230 makes such an excursion, this breaks the coupling between the first connector 214 and the second connector 244 to separate the filament tube 240 from the extruder 210. The tool rack may be positioned within an operating envelope of the robot 230 for positioning the extruder 210. For example, the tool rack may be positioned within a build volume of a three-dimensional printer, or in an adjacent area or container where fabrication does not take place, but where tools and other print-related resources can be stored.

The device 200 may further include or be in communication with a processor 206 configured to determine one or more properties of one or more filaments 202 included in respective filament tubes 240. Additionally, or alternatively, the processor 206 may be configured to create tool instructions for fabricating an object using combinations of the one or more filaments 202 based on the one or more properties determined by the processor 206. The one or more properties of the filament 202 may include a color, a material type, a texture, a mechanical property (e.g., hardness, elasticity, etc.), and combinations thereof.

The device 200 may include a tag 208 on or associated with each supply of build material (e.g., on a filament spool), on the filament tube 240, on the second connector 244, on the tool rack, or at any other suitable location where the tag 208 can be scanned for information associated with one of the build materials. The tag 208 may identify the associated build material, or provide other information for use by the processor 206 in determining one or more properties of one or more filaments 202 included in the respective filament tubes 240. The tag 208 may include, for example, one or more of a microchip, a quick response (QR) code, and a radio frequency identification (RFID) tag. In certain aspects, the processor 206 may determine the color or type of filament 202 associated with each filament tube 240 (e.g., using a tagged spool/cartridge, tagged filament tube, manual entry for each filament tube 240 by a user through a user interface, or a combination thereof). The processor 206 may create appropriate tool instructions to fabricate a multi-color or multi-material object by swapping filaments 202. In certain aspects, the tool instructions provide for swapping filaments 202 at specific points during a build. Such points during the build may be, for example, during one or more of the printing of infill to facilitate transition regions having color changes, material changes, and leaking of melted filament.

In certain aspects, the tag 208 may be removable and replaceable. For example, in instances in which the second connector 244 can be unloaded and reloaded with different filaments, the second connector 244 may include a location where the tag 208 can be affixed, using an adhesive, a magnet, or any other mechanism to place the tag 208 in a location that permits reading by a machine reading tool, a human, or both. A bulk supply of a build material, such as a spool of filament, may be packaged with a tag 208 to be used for temporarily labeling the second connector 244 in this manner.

The processor 206 may send print suggestions to a user based on the type and/or availability of filament included in the filament tubes 240. These print suggestions can include automatically making a recommendation to a user of objects to print (e.g., from a library of available models) based at least in part on an amount of filament/build material remaining in a system. For example, a model may be selected based on an amount of available material, a type of available material, and one or more preferences of a user. The processor 206 may also, or instead, recommend or make changes to slice settings (e.g., deposition rate, infill, etc.) based on an amount of filament/build material remaining in a system.

FIG. 3 is a front view of a tool rack. A tool rack 300 may define one or more openings 350. A filament tube 340 may be held in each respective opening 350. The filament tube 340 may include a second fixture 342 and a second connector 344. In use, a filament 302 may be disposed in the filament tube 340. The opening 350 may receive and secure the second fixture 342 of the filament tube 340. For example, a robot that positions an extruder of a three-dimensional printer may make an excursion, and the opening 350 may secure the second fixture 342 against such an excursion to facilitate disengaging a coupling between a first connector of the extruder and the second connector 344 of the filament tube 340 to separate the filament tube 340 from the extruder.

The tool rack 300 may define a plurality of openings 350, each opening 350 for holding a respective filament tube 340 of a plurality of filament tubes 340. In certain aspects, at least one of the plurality of filament tubes 340 includes a different color filament 302 than another one of the plurality of filament tubes 340. Additionally, or alternatively, the filament 302 in at least one of the plurality of filament tubes 340 may have a different material than the filament 302 included in another one of the plurality of filament tubes 340.

FIG. 4 is a top view of a tool rack. A tool rack 400 may define an opening 450 and an insertion path 460. The second fixture 442 of a filament tube 440 may be positionable in the opening 450 along the insertion path 460. The insertion path 460 may be, for example, a horizontal insertion path (e.g., in the x-y plane of a printer). It should be appreciated, however, that the insertion path 460 may, in general, be multidimensional. For example, the insertion path 460 may include any number of concurrent or separate movements in the x, y and z directions. Thus, at least one of the second fixtures 442 may be locked into place in the tool rack 400 using a sequence of movements that docks the second fixture 442 in the tool rack 400 such that the second fixture 442 is secure in the opening 450 against dislodgement by a force in any single direction. This approach may take a predetermined amount of time to dock and undock the second fixtures 442. Additionally, or alternatively, this approach can facilitate handling or moving the entire tool rack 400 without dislodging the second fixtures 442.

The tool rack 400 may include a heating element 402 for preheating a plurality of the filament tubes 440 secured in the tool rack 400. In certain implementations, with the tool rack 400 heated, an end of the filament tube 440 may further include a gasket or seal to reduce the likelihood of oozing of melted filament from the filament tube 440. The system may also, or instead, include at least one of a purge wall, a purge receptacle, or a brush for cleaning one or more of the filament tube 440 and an extruder before, after, or during use. For example, at least one of a purge wall, a purge receptacle, or a brush may be located on the tool rack 400. The tool rack 400, the extruder, or both may also or instead include a sensor 404 to detect a presence of one or more of the filament tubes 440 included in the tool rack 400.

Figure 5:
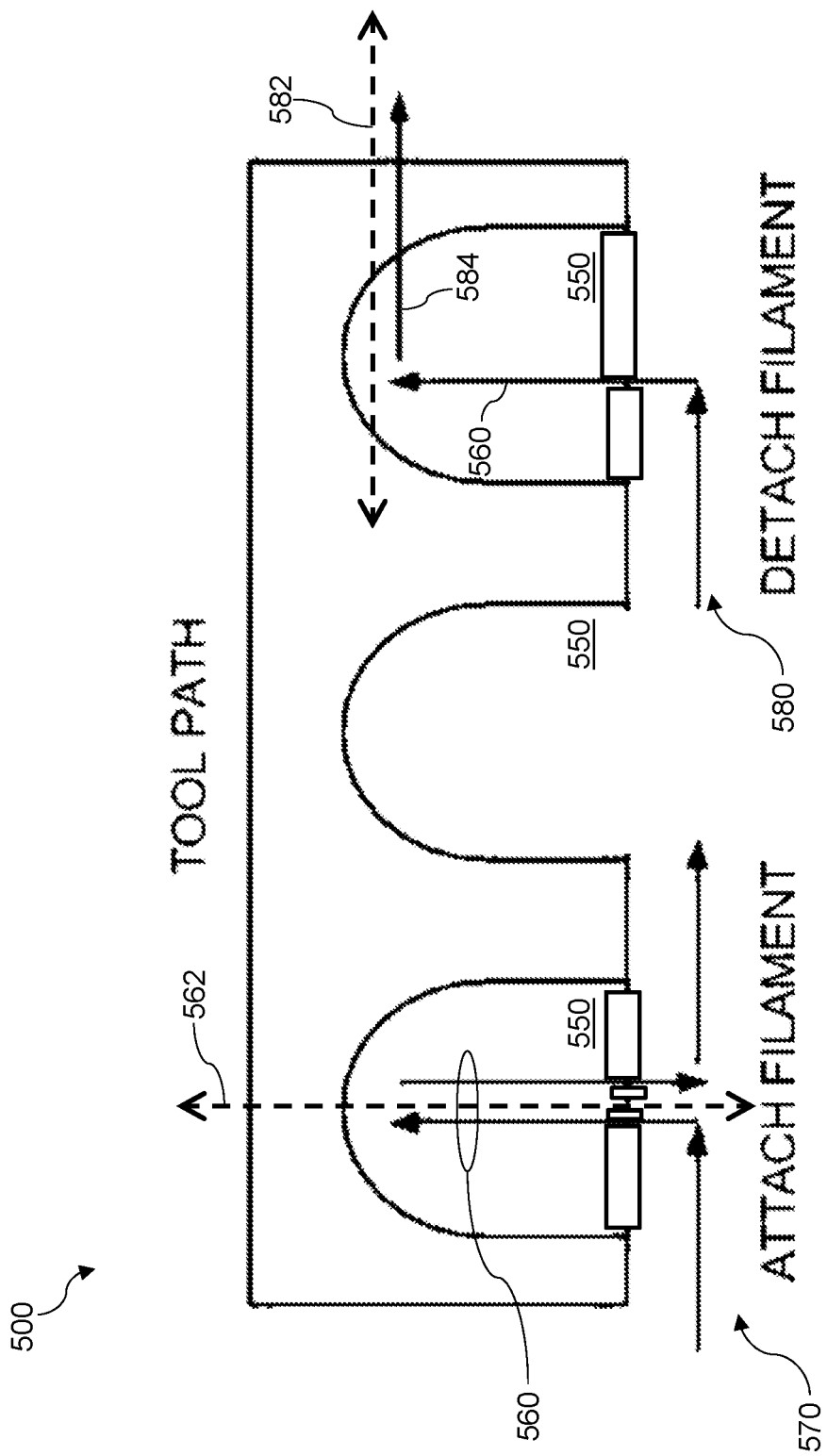
FIG. 5 is a schematic representation of tool paths of an extruder for filament swapping in three-dimensional printing.

FIG. 5 is a schematic representation of tool paths of an extruder for filament swapping in three-dimensional printing. A tool rack 500 may define one or more openings 550 and define insertion paths 560 to receive and secure one or more filament tubes. The shape and structure of the tool rack 500 may, for example, provide for one or more tool paths of an extruder for filament swapping. For example, the tool rack 500 may provide for a first tool path 570 for attaching a filament tube to an extruder, and a second tool path 580 for detaching a filament tube from an extruder.

The first tool path 570 may include a path for positioning the extruder along the insertion path 560. In certain aspects, the insertion path 560 is a horizontal insertion path located at a predetermined height. Thus, for example, a robot that moves the extruder of a three-dimensional printer may be movable to position the extruder to receive and secure a second fixture (with a filament tube) from a predetermined position beneath the opening 550 in the tool rack 500, and to move the extruder along a first axis 562 parallel with the insertion path 560 for exiting the tool rack 500 with the extruder coupled with the filament tube. Movement along the insertion path 560 may facilitate maintaining a coupling between the extruder and filament tube as the extruder exits the tool rack 500. While the extruder may be positioned below the fixture, with the resulting feedpath aligned directed downward toward an object being fabricated, it will be understood that other arrangements are additionally, or alternatively, possible. For example, the tool rack may be configured to store tools vertically or in some other orientation, and an extruder may be inverted or otherwise rotated off axis before, during, or after traveling through the insertion path 560. Thus, for example, tools may be stored vertically in a rack with a filament and feedpath horizontally disposed, in which case the extruder may be rotated about ninety degrees on its axis and then directed toward the tool rack 500 to engage or disengage one of the fixtures via an insertion path 560 disposed in a vertical plane. More generally, any useful rotational and/or translational orientation of the insertion path 560, the extruder, the tool rack 500, and the fixture may be employed without departing from the scope of this disclosure.

The second tool path 580 may include an excursion 584 by the extruder (e.g., a robot positioning the extruder) from the insertion path 560 to facilitate disengaging a coupling between a first connector on the extruder and a second connector on a filament tube to separate the filament tube from the extruder. The excursion 584 may include, for example, a horizontal departure from the insertion path 560. The excursion 584 may also, or instead, include a vertical departure from the insertion path 560. Thus, the robot may position the extruder along the insertion path 560 to deposit a second fixture in the opening 550 and, further or instead, may move the extruder away from the insertion path 560 for an excursion 584 to decouple the filament tube from the extruder. The excursion 584 may include movement along a second axis 582 that intersects the first axis 562. For example, the second axis 582 may be substantially perpendicular to the first axis 562.

Figure 6:
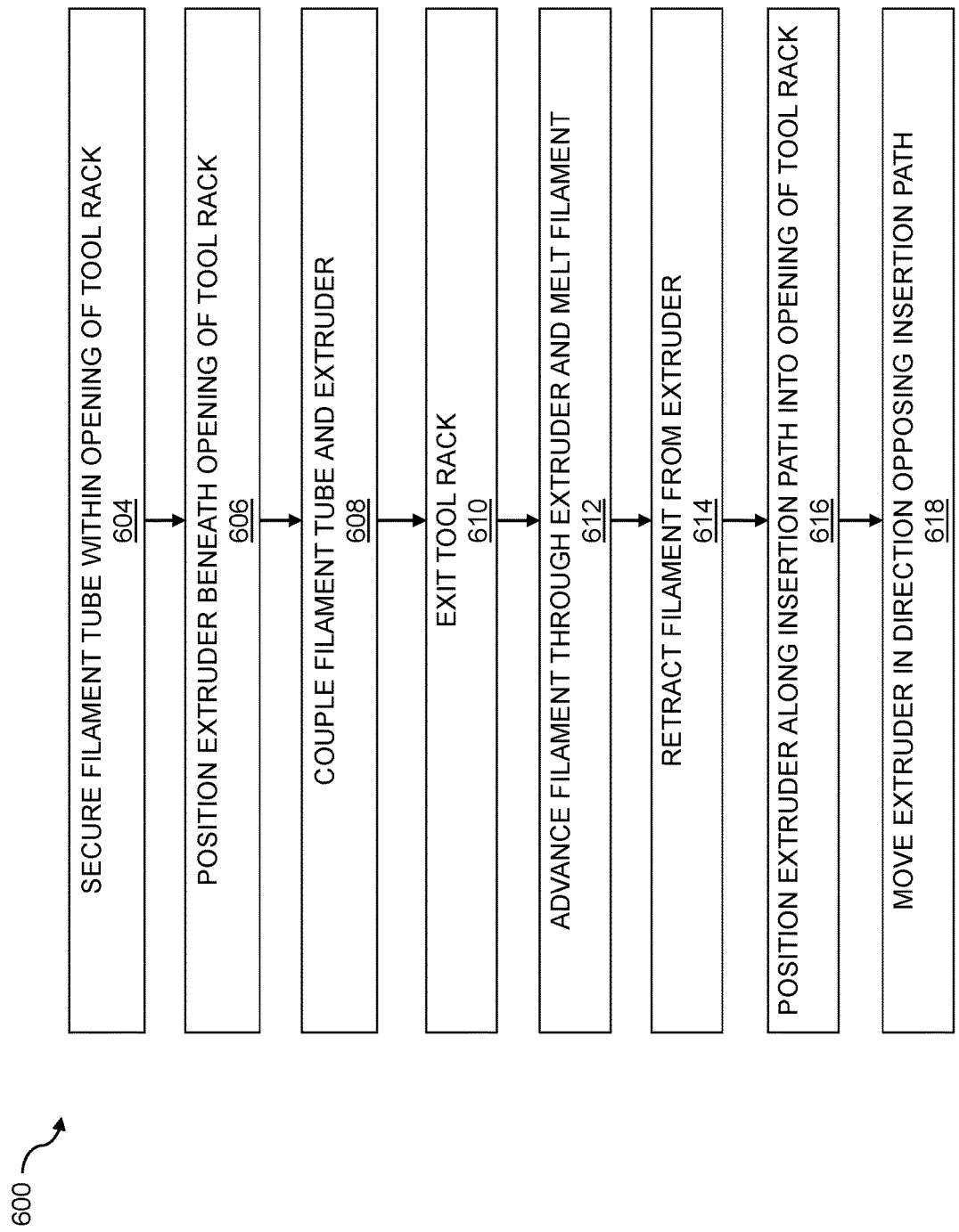
FIG. 6 is a flow chart of a method for filament swapping in three-dimensional printing.

FIG. 6 is a flow chart of a method for filament swapping in three-dimensional printing.

As shown in step 604, the method 600 may include securing a filament tube within an opening defined by a tool rack. This may include securing a plurality of filament tubes within a plurality of respective openings defined by the tool rack. The filament tube may be securable in a predetermined alignment with an extruder through a coupling (e.g., a magnetic coupling) between a first connector of the extruder and a second connector of the filament tube. The predetermined alignment of the filament tube and the extruder may define a feed path for the filament through the filament tube and the extruder.

As shown in step 606, the method 600 may include positioning the extruder beneath the opening defined by the tool rack. For example, the extruder may be positioned such that it is disposed a predetermined distance beneath the opening defined by the tool rack. At the predetermined distance, the first connector of the extruder may be secured to the second connector of the filament tube such that the filament tube is coupled in the predetermined alignment with the extruder.

As shown in step 608, the method 600 may include coupling the filament tube and the extruder to one another. Such a coupling may include a mechanical coupling, such as, for example, a magnetic coupling between the filament tube and the extruder.

As shown in step 610, the method 600 may include exiting the tool rack. Exiting the tool rack may, for example, include moving the extruder, coupled with the filament, tube along an insertion path for exiting the tool rack while maintaining the coupling of the extruder and filament tube. In certain aspects, by following the insertion path, forces below a disengagement force of the coupling will be applied to the coupling between the extruder and the filament tube such that the extruder and the filament tube remain coupled to one another as the extruder and the filament tube are moved along the insertion path.

As shown in step 612, the method 600 may include advancing the filament through the extruder and melting the filament for extrusion through an extrusion port, defined by the extruder, for fabricating an object in a three-dimensional printing process.

As shown in step 614, the method 600 may include retracting the filament from the extruder (e.g., for decoupling of the extruder and the filament tube). Retracting the filament from the extruder may facilitate, for example, loading a new filament onto the extruder. In some aspects, a mechanical system loads the filament from a filament tube into the extruder using a drive system (e.g., when the extruder couples to the filament tube or after). Once the extruder is finished fabricating using this filament, the filament may be retracted from the extruder to facilitate loading a new filament. Retraction may occur before the extruder engages the tool rack or after the extruder engages the tool rack. In certain aspects, breaking the coupling of the first connector and the second connector via an excursion acts to sheer or slice the filament such that retraction may not be needed.

As shown in step 616, the method 600 may include positioning the extruder, coupled with the filament tube, along the insertion path and into the opening defined by the tool rack such that a fixture of the filament tube is in the opening (to deposit the fixture in the opening).

As shown in step 618, the method 600 may include moving the extruder for an excursion, in a direction opposing the insertion path, to decouple the filament tube from the extruder. The excursion may include one or more of a horizontal departure from the insertion path and a vertical excursion from the insertion path. More generally, in this context, a direction "opposing" the insertion path may include any direction that is constrained by the tool rack such that, for example, the extruder can be separated from the filament tube.

Figure 7:
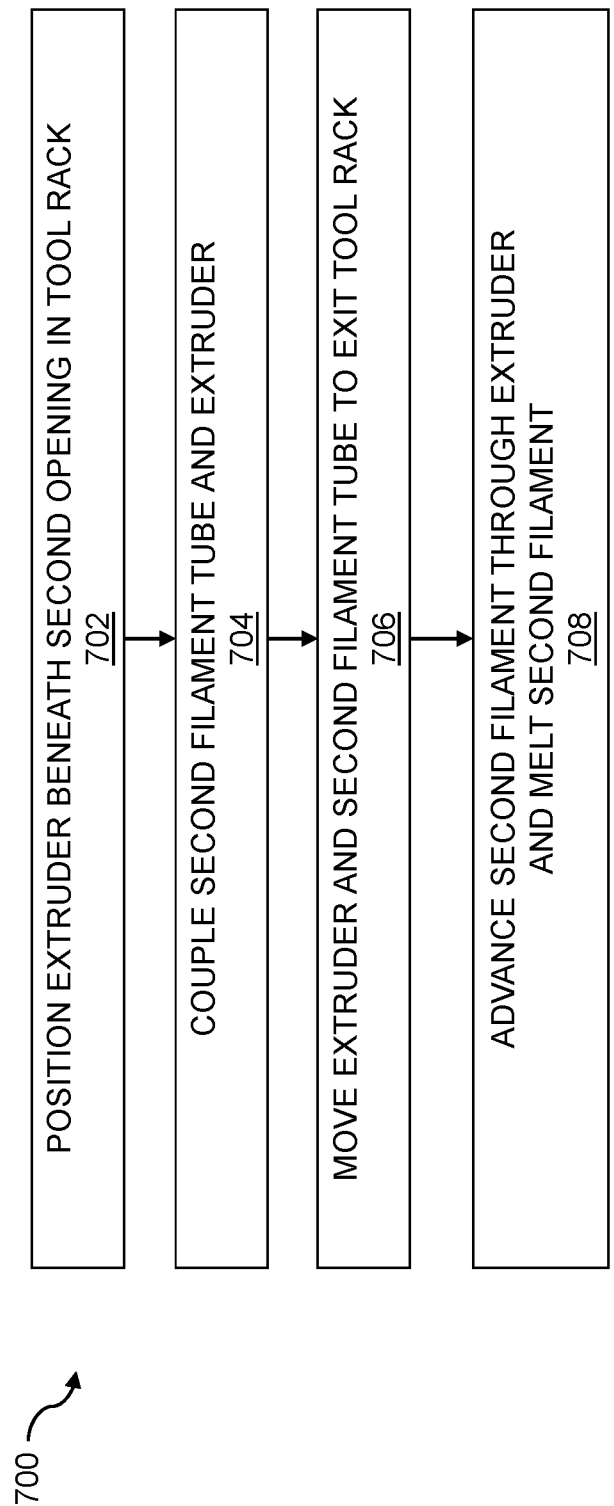
FIG. 7 is a flow chart of a method for filament swapping in three-dimensional printing.

FIG. 7 is a flow chart of a method for filament swapping in three-dimensional printing. The method 700 may be in addition to, or as an alternative to, the method recited above with reference to FIG. 6.

As shown in step 702, the method 700 may include positioning the extruder a predetermined distance beneath a second opening defined by the tool rack to secure the first connector of the extruder with a third connector of a second filament tube such that the second filament tube is coupled to the extruder. In certain aspects, the second filament is at least one of a different color and material than a filament previously extruded.

As shown in step 704, the method 700 may include coupling the second filament tube and the extruder. The coupling may be, for example, any one or more of the various different couplings described herein.

As shown in step 706, the method 700 may include moving the extruder, coupled with the second filament tube, along a second insertion path for exiting the tool rack while maintaining the coupling of the extruder and second filament tube.

As shown in step 708, the method 700 may include advancing a second filament through the extruder and melting the second filament for extrusion through the extrusion port as part of a three-dimensional printing process for fabricating an object.

The above systems, devices, methods, processes, and the like may be used in conjunction with, be supplemented by, or otherwise include an extruder with a drive system for feeding two or more filaments. The above systems, devices, methods, processes, and the like may also or instead be used in conjunction with, be supplemented by, or otherwise include a supply-side drive system that feeds filament into the extruder or the filament tubes. In an aspect, the supply-side drive system feeds filament into the filament tubes in the tool rack, reducing the pull force required by the drive system of the extruder. For example, each filament tube may be associated with its own supply-side drive system.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
   an extruder including a first fixture with a first connector, a drive gear to advance a filament through the extruder, and a heat source arranged to melt the filament into a melted state in the extruder, the extruder defining an extrusion port through which the filament in the melted state is extrudable;
   a robot coupled to the extruder, the robot movable to position the extruder in a three-dimensional printing process;
   a filament tube having a second fixture with a second connector, the second connector engageable with the first connector to form a coupling securing the filament tube in a predetermined alignment with the extruder to define a feed path for the filament through the filament tube and the extruder; and
   a tool rack defining a plurality of openings each defining a corresponding insertion path, wherein each opening is sized and shaped such that the second fixture of the filament tube is positionable therein by moving along the corresponding insertion path, and wherein each opening is sized and shaped such that, when the second fixture of the filament tube is positioned therein, a structure of the tool rack surrounding a portion of the opening secures the second fixture of the filament tube against an excursion by the robot off of the corresponding insertion path with the extruder to disengage the coupling between the first connector and the second connector and separate the filament tube from the extruder.

2. The device of claim 1, wherein the first connector includes a first magnet, the second connector includes a second magnet, and the coupling includes a magnetic coupling between the first magnet and the second magnet.

3. The device of claim 1, wherein one or more of the corresponding insertion paths is a horizontal insertion path at a predetermined height.

4. The device of claim 3, wherein the excursion of the robot includes a horizontal departure from the horizontal insertion path.

5. The device of claim 1, wherein the excursion of the robot includes a vertical departure from the corresponding insertion path.

6. The device of claim 1, further comprising a plurality of filament tubes, wherein each opening of the plurality of openings is sized to hold a respective filament tube of the plurality of filament tubes.

7. The device of claim 6, wherein at least one of the plurality of filament tubes includes a different color filament than another one of the plurality of filament tubes.

8. The device of claim 6, wherein at least one of the plurality of filament tubes includes a filament having a different material than a filament included in another one of the plurality of filament tubes.

9. The device of claim 6, further comprising a processor configured to determine one or more properties of one or more filaments included in the plurality of filament tubes, and to create tool instructions for fabricating an object using the one or more filaments based on the one or more properties.

10. The device of claim 9, further comprising a tag on one or more of a filament spool or a filament tube, the processor configured to determine the one or more properties of the one or more filaments included in the plurality of filament tubes based on the tag.

11. The device of claim 1, wherein the robot is configured to position the extruder to receive and secure the second fixture of the filament tube from a predetermined position beneath an opening in the tool rack and to move the extruder along a first axis parallel to the corresponding insertion path such that the extruder exits the tool rack with the extruder coupled with the filament tube.

12. The device of claim 11, wherein the robot is configured to position the extruder along the corresponding insertion path to position the second fixture of the filament tube in the opening and to move the extruder away from the corresponding insertion path for an excursion to decouple the filament tube from the extruder.

13. The device of claim 12, wherein the excursion includes movement along a second axis intersecting the first axis.

14. The device of claim 13, wherein the second axis is substantially perpendicular to the first axis.

15. The device of claim 1, wherein the tool rack includes a heating element arranged to preheat a plurality of filament tubes secured in the tool rack.

16. The device of claim 1, wherein the robot includes an x-y-z positioning system of a three-dimensional printer, and wherein the tool rack is within an operating envelope of the x-y-z positioning system.

17. The device of claim 1, further comprising a sensor, where a presence of one or more filament tubes in the tool rack is detectable by the sensor.

18. A method comprising:
securing a filament tube within an opening of a tool rack having a plurality of openings each defining a corresponding insertion path, the filament tube securable in a predetermined alignment with an extruder through a coupling between a first connector of the extruder and a second connector of the filament tube, the predetermined alignment of the filament tube and the extruder defining a feed path for a filament through the filament tube and the extruder;
positioning the extruder at a predetermined distance beneath the opening defined by the tool rack, where, at the predetermined distance, the first connector of the extruder is secured to the second connector of the filament tube such that the filament tube is coupled in the predetermined alignment with the extruder;
moving the extruder, coupled with the filament tube, along the corresponding insertion path for exiting the tool rack while maintaining the coupling of the extruder and the filament tube;
advancing the filament through the extruder and melting the filament for extrusion through an extrusion port defined by the extruder;
retracting the filament from the extruder;
positioning the extruder, coupled with the filament tube, along the corresponding insertion path and into the opening defined by the tool rack such that a fixture of the filament tube is disposed in the opening and secured from movement in a direction opposing the corresponding insertion path by a structure of the tool rack surrounding a portion of the opening; and
moving the extruder, in the direction opposing the corresponding insertion path, to decouple the filament tube from the extruder.

19. The method of claim 18, further comprising:
positioning the extruder the predetermined distance beneath a second opening of the plurality of openings defined by the tool rack to secure the first connector of the extruder with a third connector of a second filament tube such that the second filament tube is coupled with the extruder;
moving the extruder, coupled with the second filament tube, along a second insertion path corresponding to the second opening for exiting the tool rack while maintaining the coupling of the extruder and second filament tube; and
advancing a second filament through the extruder and melting the second filament for extrusion through the extrusion port.

20. The method of claim 18, wherein the direction opposing the corresponding insertion path includes one or more of a horizontal departure from the corresponding insertion path and a vertical departure from the corresponding insertion path.

* * * * *